United States Patent [19]
Henninger et al.

[11] Patent Number: 5,261,772
[45] Date of Patent: Nov. 16, 1993

[54] DEVICE TO CONNECT DETACHABLY TWO COMPONENTS

[75] Inventors: Peter Henninger, Bad Soden; Peter Döbbeler, Kirchhundem; Manuel Carrillo Castillo, Bad Camberg, all of Fed. Rep. of Germany

[73] Assignee: Camloc GmbH, Kelkheim, Fed. Rep. of Germany

[21] Appl. No.: 775,521

[22] Filed: Oct. 15, 1991

[30] Foreign Application Priority Data

Oct. 13, 1990 [DE] Fed. Rep. of Germany ....... 4032565

[51] Int. Cl.$^5$ ............................................. F16B 13/04
[52] U.S. Cl. .......................................... 411/46; 411/15; 411/61
[58] Field of Search .................... 411/45, 57, 39, 40, 411/41, 60, 56, 48, 71, 72, 15, 46, 520, 516, 172, 173, 174, 175, 61, 913, 103, 105, 970; 24/293, 295

[56] References Cited

U.S. PATENT DOCUMENTS

| | | |
|---|---|---|
| 2,208,779 | 7/1940 | Tinnerman ............................ 411/61 |
| 2,340,423 | 2/1944 | O'Shaughnessy, Jr. et al. .... 411/57 |
| 2,590,264 | 3/1952 | Meyers et al. ....................... 24/295 |
| 2,826,110 | 3/1958 | Lemelson ............................. 411/57 |
| 2,936,668 | 5/1960 | Meyer ................................. 411/520 |
| 3,375,749 | 4/1968 | Coldren et al. ...................... 411/15 |
| 3,871,430 | 3/1975 | Meyer ............................. 411/913 X |
| 4,431,355 | 2/1984 | Junemann ........................ 411/15 X |

FOREIGN PATENT DOCUMENTS

| | | | |
|---|---|---|---|
| 2251573 | 5/1974 | Fed. Rep. of Germany ........ 411/60 |
| 1464727 | 1/1967 | France ................................. 24/295 |
| 2617248 | 12/1988 | France ................................. 411/39 |

*Primary Examiner*—Rodney M. Lindsey
*Attorney, Agent, or Firm*—Wenderoth, Lind & Ponack

[57] ABSTRACT

A device to detachably connect two, e.g., plate-shaped subassemblies, includes a control element with a projecting retaining portion which can be inserted into aligned openings of the subassemblies and with a head portion to be braced against the first subassembly. The projecting retaining portion has at least one lateral first recess to receive and engage with at lest one locking element of a holding element. The locking element yields flexibly and resiliently when inserting the control element into the holding element. The holding element also has expanding elements to brace against a rear side of the second subassembly. Both the control element and the holding element can be inserted individually in succession or together from a front side of the first subassembly into the aligned openings. The holding element with the expanding elements can be inserted into the openings. By moving the projecting retaining portion coaxially into the holding element to a locking position the expanding elements of the holding element can be spread outwardly of the openings.

25 Claims, 5 Drawing Sheets

DEVICE TO CONNECT DETACHABLY TWO COMPONENTS

BACKGROUND OF THE INVENTION

The invention relates to a device to connect detachably two, e.g., plate-shaped subassemblies. The device includes a control element having a projecting retaining portion that can be inserted into aligned openings of the subassemblies and a head segment to be braced against the first subassembly. The projecting retaining portion has on a face thereof at least one lateral first recess to receive and engage with at least one locking element that yields flexibly when inserting the control element and that is part of a holding element having expanding elements to brace on a rear side of the second subassembly. Both the control element and the holding element can be inserted individually in succession or together from a front side of the first subassembly into the aligned openings.

From DE-OS 39 00 468 is known a connecting device including a holding element having backward ends to be braced by expanding arms, which are bent down to the side and which can flexibly yield when pushed through an opening of a second subassembly. The holding element is held in a guide sleeve for a projecting portion. To assembly and disassembly such device, a control element must be rotated relative to the holding element, so that arresting claws lock flexibly into recesses of the control element or are lifted therefrom, a feature that can possibly cause difficulties.

SUMMARY OF THE INVENTION

The object of the present invention is to provide a device of the aforementioned type that with a simpler construction and having a reliable yet simply detachable locking mechanism for connecting together the subassemblies.

This object is achieved in accordance with the invention in that the holding element has expanding elements that in a compressed state can be inserted into the openings. By moving the projecting retaining portion axially into the holding element to a locking position, the expanding elements of the holding element can spread outwardly beyond the cross section of the openings. In this manner the holding element can be inserted into the openings of the subassemblies without a significant amount of energy. The holding element is not locked to the subassemblies until the control element is moved into the holding element as far as the locking position at which the expanding elements, extending resiliently from the holding element that optionally also may be resilient, have been pushed outwardly beyond the cross section of the openings. In the locking position the control element is locked to the holding element by the locking element of the holding element locking into the first recess provided in the projecting retaining portion. Since the first recess extends over only one face of the projecting retaining portion, the locking element can be moved out of the locking position by moving the control element along its longitudinal axis. The control element can be detached with the holding element by moving the expanding element inwardly and releasing the holding element from clamping the subassemblies.

To safeguard against relative axial rotation or twisting, projecting retaining portion of the control element and/or the part of the holding element that can be inserted into the openings can be substantially not round, preferably polygonal, and in particular rectangular or square in a sectional plane parallel to the main plane of extension of the plate-shaped subassemblies.

The problem on which the invention is based can be solved reliably with simple means especially when, according to a further development of the inventive concept, the projecting retaining portion has a spreading member, which is provided preferably with a wedge-shaped front end or portion and which, while moving the control element into the locking position, pushes the expanding elements outwardly against an inwardly acting spring force thereof.

The holding element and the control element can form a preassembled unit in a simple manner if at an axial distance from the first recess, in the direction of the free end of the projecting retaining portion, such portion has at least a second recess into which fits the locking element, thus holding the holding element in a preassembled position. This preassembled unit, including the holding element and the control element, can be inserted together into the openings of the subassemblies to be connected.

The first and second recesses preferably are spaced axially in such a manner that in the preassembled position of the holding element to the control element the expanding elements are not yet stressed by the spreading member. Rather, not until movement to the locking position at which the locking element is locked in the first recess are the expanding elements pushed outwardly. In this manner it is guaranteed that the preassembled unit comprising the control element and the holding element can be inserted in a simple manner into the aligned openings of the subassemblies to be connected together.

Another feature of the invention is that, when inserted into the opening of the first subassembly, the holding element has arresting means that can be moved axially while yielding elastically inwardly and that, following insertion through the opening, will resiliently spring back with stop edges confronting and behind a rear side of the first subassembly. Thus, both the holding element itself or a unit comprising the molding element and the control element can be preassembled to the first subassembly before the second subassembly is connected thereto. The final connection of the two subassemblies is accomplished in such a manner that the first subassembly with its already preassembled element or unit is brought into alignment with the opening in the second subassembly. The holding element or the unit comprising the holding element and the control element is inserted into the opening of the second subassembly. Then the control element is pushed into its final locking position by pressure applied in the axial direction to the head portion of said control element. Thereby, the expanding elements are pushed outwardly, and thus the two subassemblies are clamped between the contact sections abutting the front side of the first subassembly and the expanding elements of the holding element abutting the rear side of the second subassembly.

For the sake of simplicity, the locking element or elements can be designed as flexible tongues with rounded areas forming the locking portions. Thus, movement of the control element into its preassembled position and also into its final locking position need overcome only the spring force of the spring tongues, thereby avoiding the risk of tilting. Also for the sake of simplicity, the flexible tongue of the locking element can have rearward stop edge. To lock undetachably the control element to the holding element and thus optionally also to the first subassembly in the preassembled state, the second recess in the projecting retaining portion can define a stop edge for the inwardly movable free end of the locking element.

Even if a second recess is formed in only one opposite surface of the projecting retaining portion of the control element, the control element can move without more effort from the holding element solely after displacement by a specified distance along its longitudinal axis relative to the holding element.

Preferably, two locking elements are offset relative to two expanding elements at predetermined angles, e.g. by 90° about the longitudinal axis of the holding element. Thereby, it is possible to manufacture the holding in a simple manner without the functions of the locking elements and expanding elements having a negative effect on each other. In particular, it is provided that two locking elements and two expanding elements are diametrally opposite one another in alignment with respective portions of the projecting retaining portion of the control element to be received therebetween.

For the sake of simplicity, the holding element itself can be formed by bending from a single flat material blank made of a resilient material, e.g., metal such as steel. Thereby, the expanding elements are formed preferably by segments of the flat material blank that are bent back themselves, whereby the following functions are reliably guaranteed. Thus, the holding element can be inserted without tilting through the openings of the subassemblies. Also, the passage of the spreading member during axial movement of the control element as far as its locking position can be achieved without tilting. A reliable clamping of both subassemblies after moving the control element into its locking position and simplified removal of the holding element after its use is achieved. Such features are ensured due to the rounded shapes of the expanding elements.

The control element itself can be an injection molded part made of metal or plastic.

BRIEF DESCRIPTION OF THE DRAWINGS

Other objects, features, advantages and possible application of the present invention will be apparent from the following description of embodiments thereof, with reference to the accompanying drawings, wherein all described and/or illustrated features form in themselves or in any arbitrary combination the subject matter of the present invention, and wherein:

FIGS. 7a to 7c are side, top and side views of the holding element according to FIGS. 1 to 4;

FIG. 7d is a sectional view along line VIId-VIId of FIG. 7a of the holding element according to FIG. 7a.

DETAILED DESCRIPTION OF THE INVENTION

Figure 1:
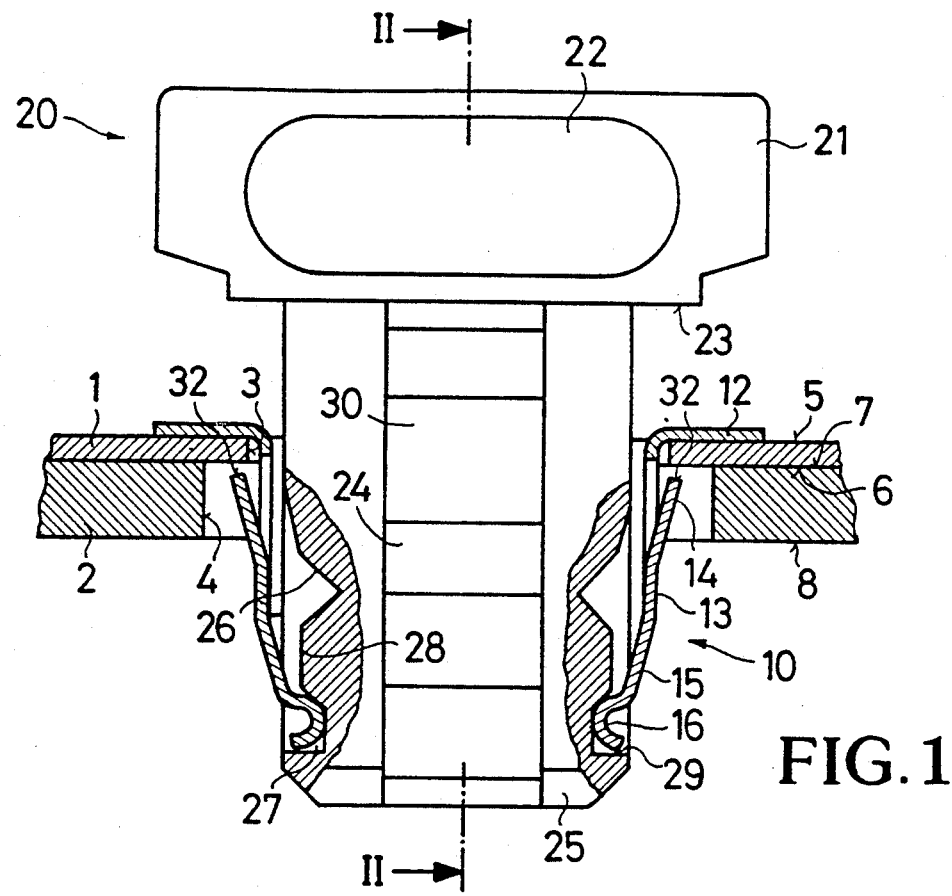
FIG. 1 is a partial side view and partial sectional view of a connecting device according to the invention and shown in a preassembled position of a control element.

The device of the invention connects detachably two subassemblies or components 1 and 2 that are plate-shaped at least in the region of connection and includes a control element 20 comprises a head portion 21 having an inner or rearward contact surface 23 intended to be braced toward a front side 5 of first subassembly 1 and a recessed grasping area 22. Control element 20 also includes a projecting retaining portion 25 extending from head portion 21 and intended for and is suitable to be inserted through two aligned openings 3 and 4 of the subassemblies 1 and 2. As is apparent particularly in FIG. 1, portion 25 has formed in a pair of opposed sides thereof two opposed first recesses 26 that have the shape of grooved wedges and that extend solely across respective faces of such sides of portion 25.

Figure 8:
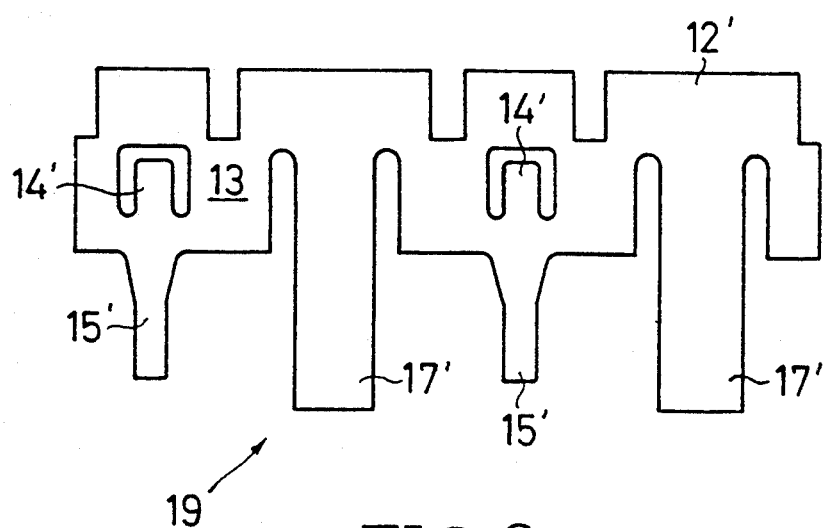
FIG. 8 is a plan view of a blank not yet bent for the manufacture of a holding element according to the invention.

The connecting device also includes a holding element 10, which is made of a flat material blank 19 (FIG. 8). The holding element 10 can be inserted through the two openings 3 and 4 of the subassemblies 1 and 2 and has upper flange-like contact sections 12 that abut the front side 5 of the first subassembly 1. Element 10 has spaced opposite side walls 13 having extending therefrom respective opposed locking elements 15 which are in the form of flexible tongues. As is apparent from FIG. 1, elements 15 have at free ends thereof respective rounded locking portions 16. When element 20 is introduced into element 10, portions 16 first engage opposed second grooves wedge recesses 27 formed axially beyond recesses 26 and which also extend solely across faces of the same sides of portion 25. Recesses 27 define adjacent the free axial end of portion 25 respective outwardly extending stop edges 29. Abutment of edges 29 against portions 16 prevents the control element 20 from being detached unintentionally from a preliminary or preassembly position shown in FIG. 1. By pushing the control element 20 further into the holding element 10, the locking portions 16 of locking elements are lifted out of the recesses 27 and move or snap into a locking position shown on the right side of FIG. 5, i.e. into first recesses 26, and in which the head portion 21 has been pushed toward the holding element 10 until surface 23 abuts the contact segments 12. The locking elements 15 then are locked elastically in the first recesses 26.

The holding element 10 further has spaced opposite downwardly projecting expanding elements 17, which are formed by bending corresponding segments 17' of the flat material blank 19 backwardly on themselves. In an inwardly compressed position of elements 17, shown on the left in FIG. 6 and in FIG. 2, permits the holding element 10 to be inserted into the openings 3, 4 without restriction. However, the expanding elements 17 lie in the path of movement of a spreading member or portion 30 of the element 25 during insertion thereof. Portion 30 is wedge-shaped at a leading end 24 thereof. Thus, when the control element 20 is pressed further downwardly, from the preassembled position shown on the left in FIGS. 5 and 6 and in FIGS. 1 and 2, into the locked position shown on the right in FIGS. 5 and 6 and in FIGS. 3 and 4, wedge surfaces 31 of the spreading member 30 move along respective inclined surfaces 9 of the expanding elements 17 and push them outwardly against their spring force until elements outwardly abut against the rear side 8 of the second subassembly 2. In this manner the subassemblies 1 and 2 are locked and held together with respective surfaces or sides 6 and 7 thereof in contact and without play by the spring force exerted by the expanding elements 17. The flange-like contact sections 12 form a counter abutment of such clamping action. A locked connection is ensured in that in the completely depressed locking position of the control element 20 the locking portions 16 of the locking elements 15 are locked in the first grooved recesses 26.

Figure 2:
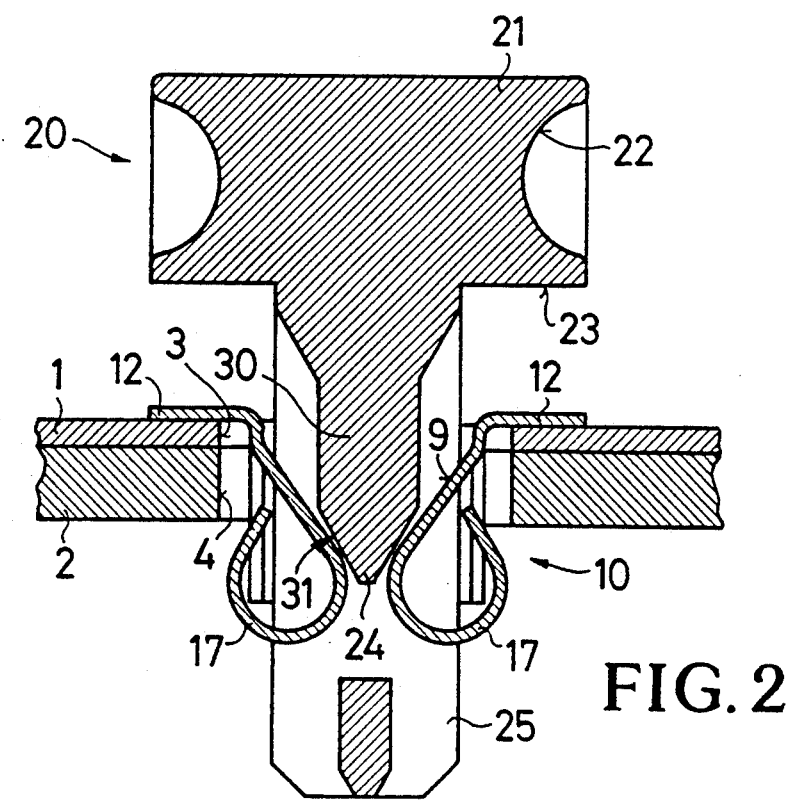
FIG. 2 is a sectional view along line II—II of FIG. 1 and showing the device still in an opening position with two subassemblies thereof not yet connected together.
Figure 4:
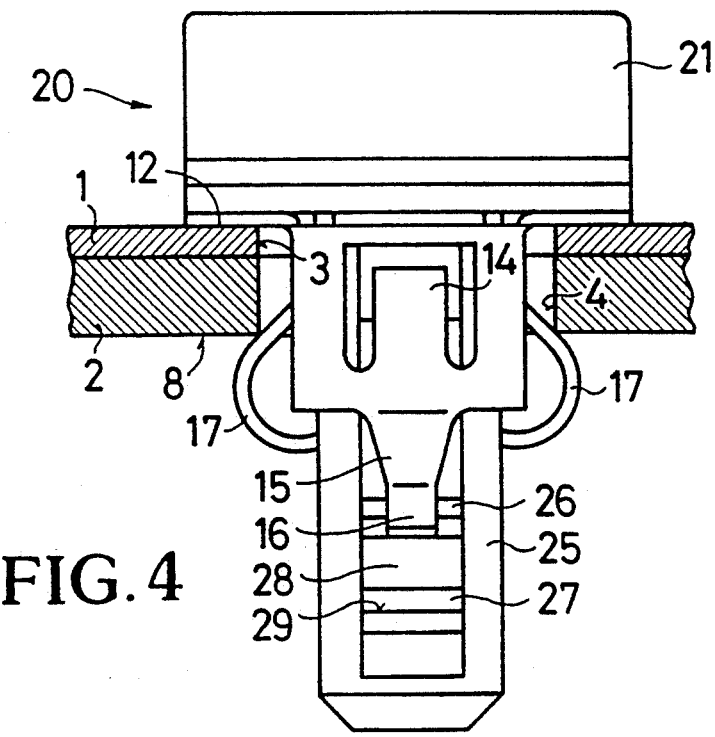
FIG. 4 is a side view viewed at a right angle to FIG. 3 showing the locking position of the control element.
Figure 5:
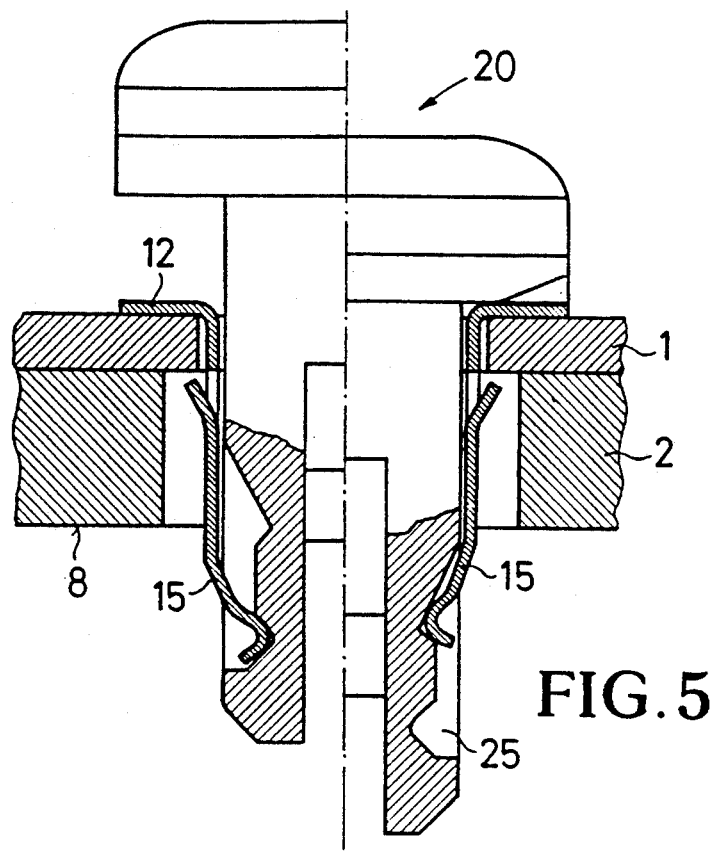
FIG. 5 is a partially sectioned view of an embodiment of the control device that differs somewhat from that of FIGS. 1 to 4, and showing at the left an opened, preassembled position and at the right a final locked position of a control element.
Figure 6:
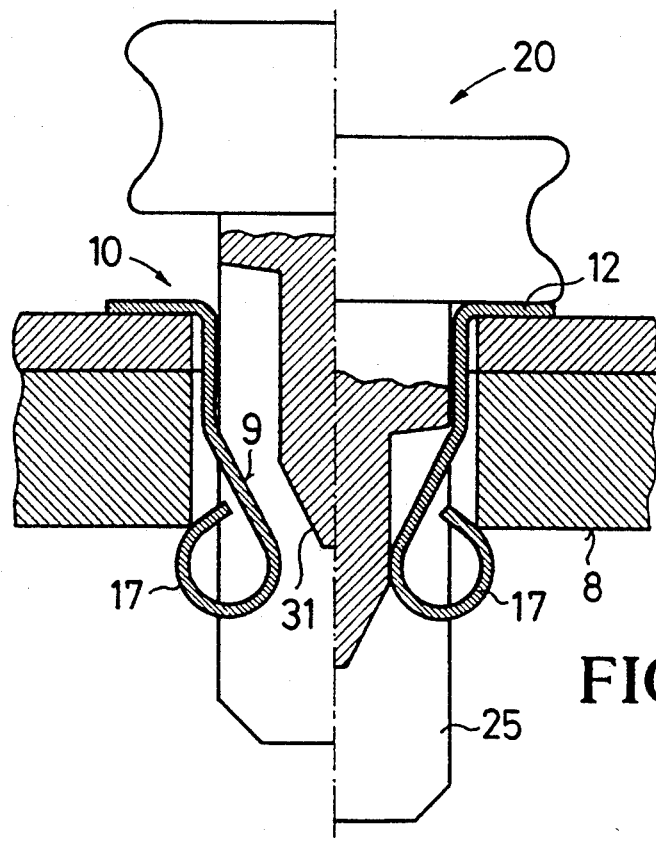
FIG. 6 is a view showing the positions according to FIG. 5 but in a section at a right angle to FIG. 5, and from which it is apparent how during axial depression of the control element into a holding element two subassemblies are securely clamped together by pushing expanding elements sideways.

The first and second recesses 26, 27 are spaced apart axially of portion 26 in a manner such that in the preassembled position of the control element 20, shown on the left in FIGS. 5 and 6 and in FIGS. 1 and 2, the expanding elements 17 are not yet stressed by the spreading member 30 of the portion 25. Rather, it is not until element 20 is moved further inwardly to the locking position, shown on the fight in FIGS. 5 and 6 and in FIGS. 3 and 4, and whereat the locking elements 16 are locked in the first recesses 26 are the expanding elements 17 stressed by being deformed and pushed outwardly.

Figure 3:
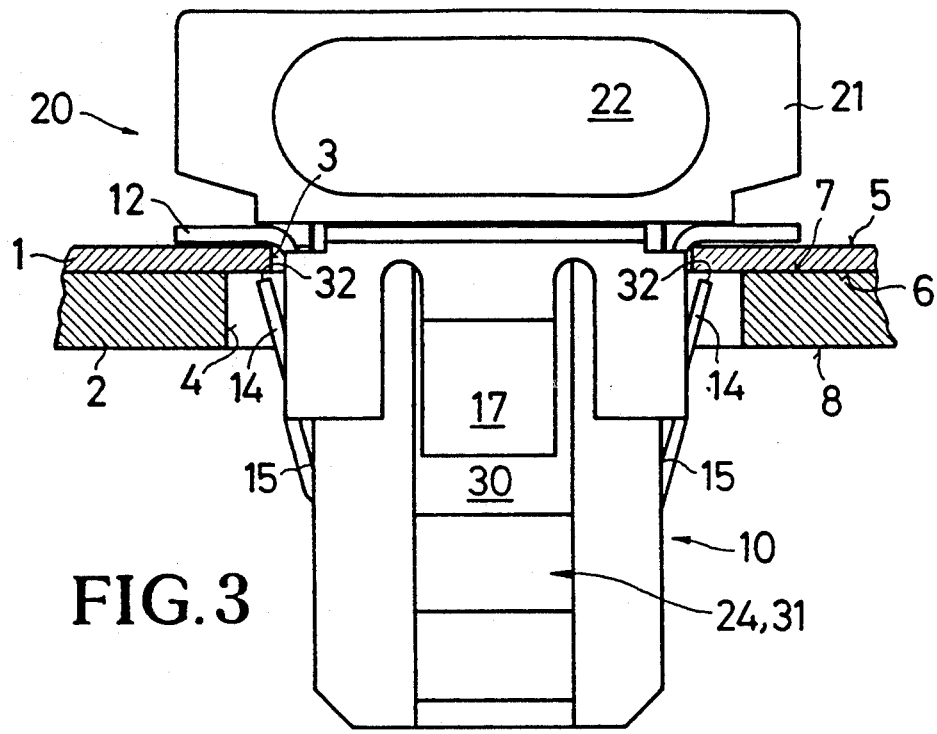
FIG. 3 is a side view of the connecting device of FIG. 1 in a locking position of the control element.

As is apparent especially from FIGS. 1 and 3, the holding element 10 has stop members or arresting means 14, which, while inserting element 10 through the opening 3 of the first subassembly 1, resiliently move or yield inwardly. Upon completion of such insertion, members 14 resiliently move outwardly and have rear stop edges 32 positioned behind the rear side 6 of the first subassembly 1. In this preassembled position, there can be some play between the stop edges 32 and the rear side 6 of the first subassembly 1. The purpose of stop edges 32 is merely that the holding element 10 is mounted undetachably to the first subassembly 1. Similarly, the control element 20 is mounted undetachably to the holding element 10 by locking of the locking portions 16 of the locking elements 15 first into the second recesses 27 portion 26 in a preassembled state. In this manner, it is possible to preassemble the holding element 10 alone to the subassembly 1, and then later when connecting the second subassembly 2 to push the control element 20 totally axially into the holding element 10 as far as the locking position. However, it is also possible to store a preassembled unit of holding element 10 and control element 20 separately and to not insert such unit into the aligned openings 3 and 4 in a preassembled state until both subassemblies 1 and 2 are connected by then pushing the control element 20 completely to its locking position. Still further, it is possible to preassemble the preassembled unit of holding element 10 and control element 20 into the first subassembly 1, and then to bring the first subassembly 1 equipped with such preassembled unit into alignment with the second subassembly 2 such that the preassembled unit projects through the opening 4. Then for final connection, the control element 20 can be pushed totally into the respective holding element 1 as far as the locking position.

In the embodiment shown, both the stop or arresting members 14 and the locking elements 15 are designed as independent flexible tongues from the flat material blank 19.

As is apparent from the drawings, the locking elements 15 are offset by 90° with respect to the longitudinal axis of the holding element 10 relative to the expanding elements 17, so that they can perform their respective functions undisturbed. Such arrangement, however, also simplifies the manufacture of the holding element 10 from a flat material blank 19, as is apparent from FIG. 8.

The control element 20 can be designed as an injected molded part of metal or plastic.

Figure 7A:
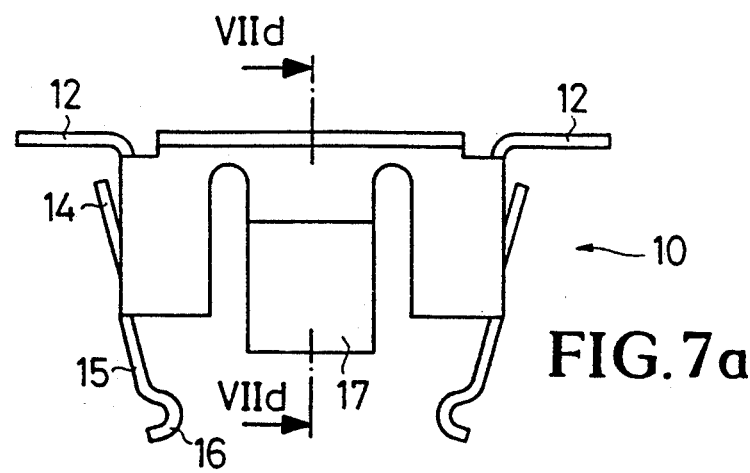
Figure 7B:
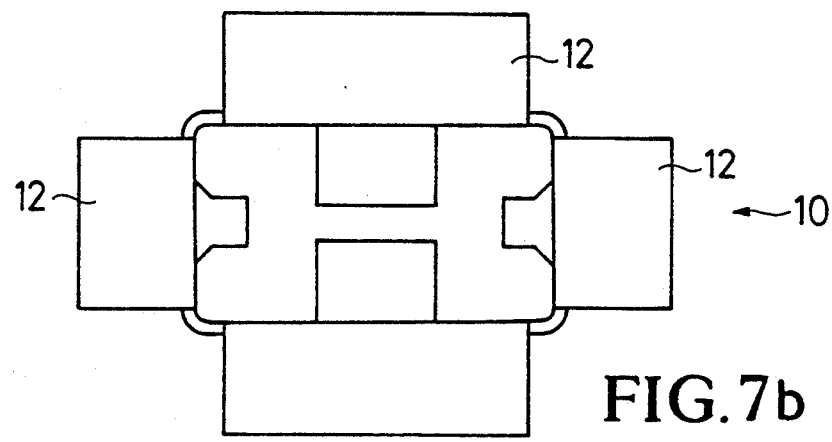
Figures 7C, 7D:
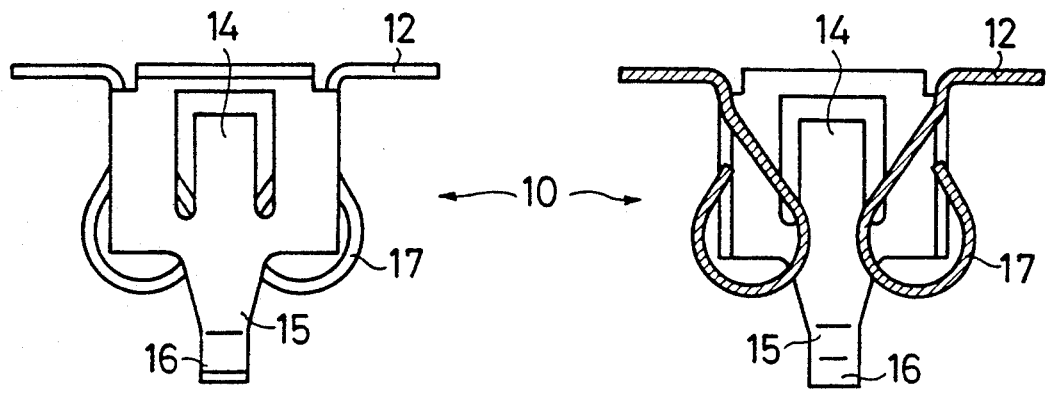

Thus, the connecting device according to the invention forms a push-pull lock that is easy to operate and that can be delivered in a preassembled state, and that can be snapped into the first subassembly 1 and later be locked or unlocked by push or pull operation. As viewed from the top (cf. FIG. 7b), the connecting device can be substantially rectangular to ensure against relative twisting between elements 10 and 20. Furthermore, the connecting device has the advantage that it can absorb shear forces quite well. The control element 20 responds only to pressure and can, therefore, be made of plastic. The connecting device according to the invention also has the advantage that the locking position is reliably ensured, and thus is suitable in fields of application with correspondingly high demands, such as in the construction of cars and airplanes or the like.

We claim:

1. A device for connecting together first and second components that are plate-shaped at least in an area of connection and that have therethrough aligned openings, said device comprising:

a holding element insertable through the aligned openings in the components, said holding element having integral therewith resilient expanding elements that are yieldable outwardly from inner positions enabling insertion of said holding element through the aligned openings to outer positions extending beyond the aligned openings, and said holding element having integral therewith at least one outwardly yieldable resilient locking element that is separate from said expanding elements;

a control element having a head portion to be braced against an outer side of the first component and a retaining portion extending axially from said head portion and insertable into said holding element to a locking position relative thereto;

said holding element and said control element being insertable individually in succession or together through the aligned openings in the components from the outer side of the first component;

said retaining portion having formed in a limited portion of an outer periphery thereof at least one locking recess into which fits said locking element when said retaining portion is inserted axially into said holding element to said locking position, thereby lockingly retaining said control element to said holding element;

said retaining portion including means for, when said retaining portion is inserted into said holding element to said locking position, moving said expanding elements from said inner positions to said outer positions to abut with an outer side of the second component, thus clamping the components between said head portion of said control element and said expanding elements of said holding element; and said retaining portion having formed therein a second recess at a position spaced axially from said locking recess in a direction away from said head portion, said locking element being retainable in said second recess to thereby hold said control element in a preassembled position relative to said holding element.

2. A device as claimed in claim 1, wherein said retaining portion has a non-circular transverse sectional configuration.

3. A device as claimed in claim 2, wherein said configuration is polygonal.

4. A device as claimed in claim 3, wherein said configuration is rectangular.

5. A device as claimed in claim 1, wherein said holding element has a non-circular transverse sectional configuration.

6. A device as claimed in claim 5, wherein said configuration is polygonal.

7. A device as claimed in claim 6, wherein said configuration is rectangular.

8. A device as claimed in claim 1, wherein said moving means comprises a spreading member operable to push said expanding elements outwardly.

9. A device as claimed in claim 8, wherein said spreading member has a wedge-shaped forward end, relative to the direction of insertion of said retaining portion.

10. A device as claimed in claim 8, wherein said spreading member is operable against an inwardly directed spring force of said expanding elements.

11. A device as claimed in claim 1, wherein said locking recess and said second recess are spaced axially by a distance such that when said control element is in said preassembled position said expanding elements are not moved outwardly by said moving means.

12. A device as claimed in claim 1, wherein said second recess defines an outwardly extending stop surface to be abutted by a free end of said locking element.

13. A device as claimed in claim 1, wherein said holding element includes integral inwardly yieldable arresting means for, upon inserting said holding element through the opening in the first component, locking said holding element thereon.

14. A device as claimed in claim 13, wherein said arresting means comprise resiliently flexible tongues having free end edges to confront a rear side of the first component.

15. A device as claimed in claim 1, wherein said locking element comprises a resiliently flexible tongue having a rounded portion dimensioned to snap into said recess.

16. A device as claimed in claim 1, wherein said holding element has at opposite sides thereof two confronting locking elements.

17. A device as claimed in claim 16, wherein said holding element has two said expanding elements confronting each other at positions offset axially of said two locking elements.

18. A device as claimed in claim 17, wherein said expanding elements are offset by approximately 90° relative to said locking elements.

19. A device as claimed in claim 1, wherein said holding element is shaped by bending from a flat, single, integral blank of resilient material.

20. A device as claimed in claim 19, wherein said material is steel.

21. A device as claimed in claim 19, wherein said expanding elements are formed by segments of said blank bent back on themselves.

22. A device as claimed in claim 1, wherein said expanding elements are in the form of tongue-shaped segments bent back on themselves.

23. A device as claimed in claim 1, wherein said control element comprises an injection molded member.

24. A device as claimed in claim 1, wherein said holding element has outwardly extending flanges to abut the outer side of the first component, and said head portion abuts said flanges.

25. A device for connecting together first and second components that are plate-shaped at least in an area of connection and that have therethrough aligned openings, said device comprising:

a holding element insertable through the aligned openings in the components, said holding element having integral therewith resilient expanding elements that are yieldable outwardly from inner positions enabling insertion of said holding element through the aligned openings to outer positions extending beyond the aligned openings, and said holding element having integral therewith at least one outwardly yieldable resilient locking element that is separate from said expanding elements;

a control element having a head portion to be braced against an outer side of the first component and a retaining portion extending axially from said head portion and insertable into said holding element to a locking position relative thereto;

said holding element and said control element being insertable individually in succession or together through the aligned openings in the components from the outer side of the first component;

said retaining portion having formed in a limited portion of an outer periphery thereof at least one locking recess into which fits said locking element when said retaining portion is inserted axially into said holding element to said locking position, thereby lockingly retaining said control element to said holding element;

said retaining portion including means for, when said retaining portion is inserted into said holding element to said locking position, moving said expanding elements from said inner positions to said outer positions to abut with an outer side of the second component, thus clamping the components between said head portion of said control element and said expanding elements of said holding element; and said locking element comprising a resiliently flexible tongue having a rounded portion dimensioned to snap into said recess.

* * * * *